United States Patent
Bennett (10) Patent No.: US 6,330,910 B1
(45) Date of Patent: Dec. 18, 2001

(54) HEAT EXCHANGER FOR A MOTOR VEHICLE EXHAUST

(76) Inventor: Easton Bennett, 293 Grand Meadow Cr., Edmonton, Alberta (CA), T6L 1W9

( * ) Notice: Subject to any disclaimer, the term of this patent is extended or adjusted under 35 U.S.C. 154(b) by 0 days.

(21) Appl. No.: 09/512,911

(22) Filed: Feb. 25, 2000

(30) Foreign Application Priority Data

Mar. 19, 1999 (CA) .................................................... 2264186
Jun. 19, 1999 (CA) .................................................... 2273698

(51) Int. Cl.[7] .............................. G05D 23/00; F01P 7/00; F28F 27/02
(52) U.S. Cl. .............................. 165/297; 165/103; 165/51; 237/12.3 A; 237/12.3 B
(58) Field of Search ................................. 165/41, 42, 43, 165/51, 103, 296, 297; 237/12.3 A, 12.3 B, 12.3 R (56) References Cited

U.S. PATENT DOCUMENTS

| | | | |
|---|---|---|---|
| 2,063,436 | * | 12/1936 | Hild ................................. 237/12.3 B |
| 2,076,287 | * | 4/1937 | Arnold ............................. 237/12.3 B |
| 2,486,429 | * | 11/1949 | Monnet ............................ 237/12.3 A |
| 2,529,915 | * | 11/1950 | Chausson ......................... 237/12.3 A |
| 6,151,891 | * | 11/2000 | Bennett ................................ 165/51 X |

FOREIGN PATENT DOCUMENTS

| | | |
|---|---|---|
| 2185076 | 3/1998 | (CA) . |
| 2247759 | 3/2000 | (CA) . |

* cited by examiner

*Primary Examiner*—Ira S. Lazarus
*Assistant Examiner*—Ljiljana V. Ciric
(74) *Attorney, Agent, or Firm*—Christensen O'Connor Johnson Kindness PLLC (57) ABSTRACT

A heat exchanger for a motor vehicle exhaust includes a tubular body having a first end, a second end, a peripheral sidewall, and at least two flow passages that extend between the first end and the second end. The at least two flow passages include at least one heat exchange fluid flow passage and at least one bypass fluid flow passage. A heat exchange coil is positioned in the at least one heat exchange fluid flow passage. The heat exchange coil has an inlet and an outlet extending through the sidewall of the tubular body. A valve is provided for selecting between the at least one heat exchange fluid flow passage and the at least one bypass fluid flow passage.

6 Claims, 7 Drawing Sheets

FIG. 7 ations of heat exchanger for a motor vehicle exhaust.

HEAT EXCHANGER FOR A MOTOR VEHICLE EXHAUST

FIELD OF THE INVENTION

The present invention relates to a heat exchanger for motor vehicle exhaust

BACKGROUND OF THE INVENTION

In Canadian Patent Application No. 2,185,076 (U.S. Pat. No. 5,799,632) Easton Bennett disclosed a novel heat exchanger configuration for a motor vehicle exhaust. This heat exchanger had an exhaust pipe with a flow passage formed of a coil of tubing. The exchange medium flows through the coil as hot exhaust gases flow through the flow passage in the centre of the coil.

In Canadian Patent Application No. 2,247,759 (U.S. patent application Ser. No. 09/158,711) Easton Bennett disclosed an improvement to the novel heat exchanger configuration. This heat exchanger had the coil of tubing with the central flow passage positioned in a larger housing, thereby forming an annular flow down the outside of the coil of tubing, in addition to the central flow passage. This configuration proved to be even more efficient for heat transfer.

In some applications, however, there is a concern that the coolant used as exchange medium will become over heated.

SUMMARY OF THE INVENTION

What is required is an alternative configuration of heat exchanger for a motor vehicle exhaust.

According to the present invention there is provided a heat exchanger for a motor vehicle exhaust which includes a tubular body having a first end, a second end, a peripheral sidewall, and at least two flow passages that extend between the first end and the second end. The at least two flow passages include at least one heat exchange fluid flow passage and at least one bypass fluid flow passage. A heat exchange coil is positioned in the at least one heat exchange fluid flow passage. The heat exchange coil has an inlet and an outlet extending through the sidewall of the tubular body. A valve is provided for selecting between the at least one heat exchange fluid flow passage and the at least one bypass fluid flow passage.

The heat exchanger, as described above, has a normal operating mode in which all exhaust gases are diverted through the heat exchange fluid flow passage to effect a heat exchange with fluid flowing through the heat exchange coil. However, when such a heat exchange is not desired, the valve is repositioned to divert all exhaust gases through the bypass fluid flow passage. It is also possible to put the valve in an intermediate position to have only a portion of the exhaust gases flow through the heat exchanger flow passage, as will hereinafter be further described.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

A first embodiment of heat exchanger for a motor vehicle exhaust, generally identified by reference numeral 10, will be described with reference to FIGS. 1 and 2.

Figure 1:
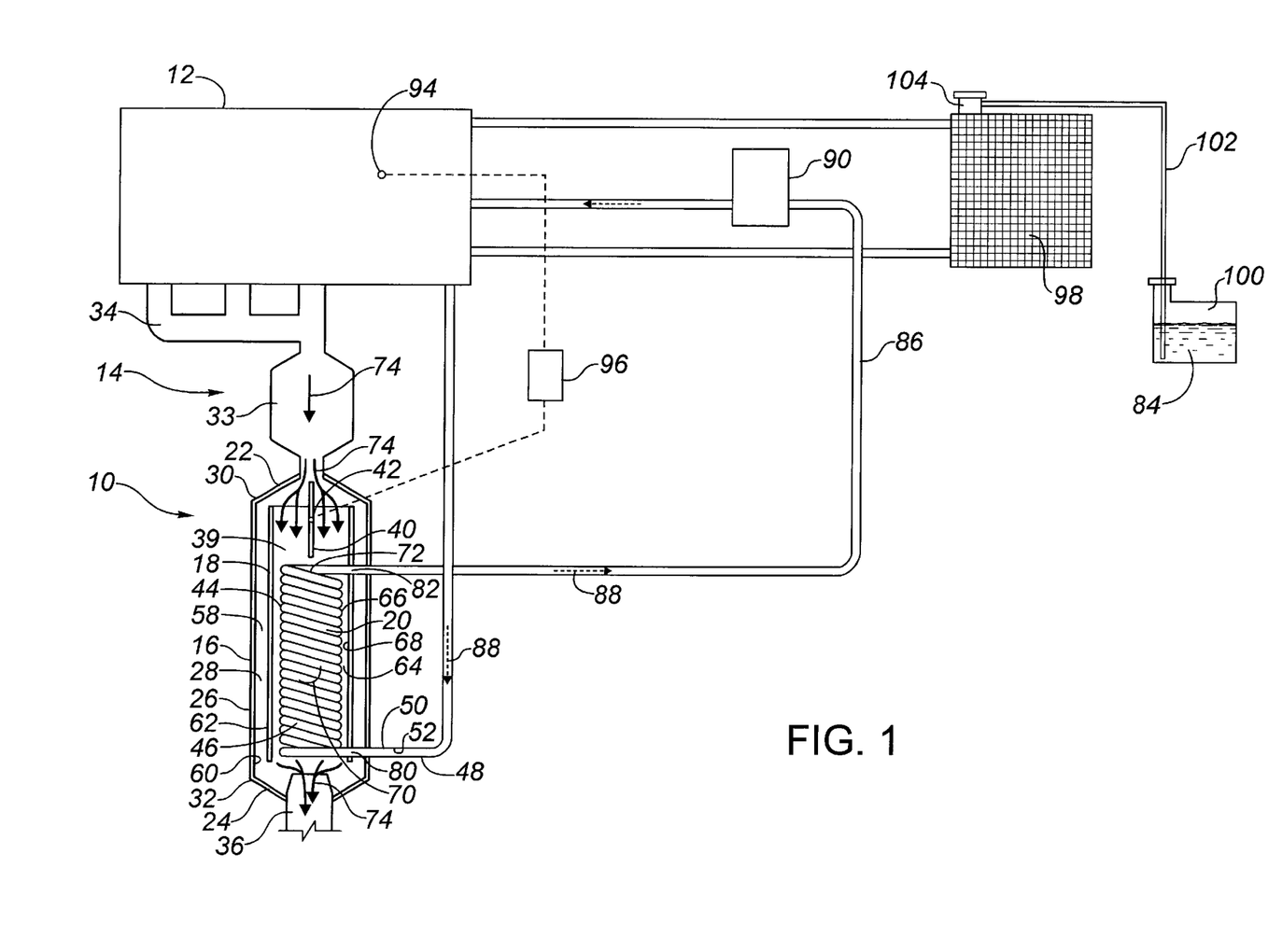
FIG. 1 is a schematic diagram, partially in section, of a first embodiment of heat exchanger for a motor vehicle exhaust constructed in accordance with the teachings of the present invention combined in combination with a motor vehicle exhaust.
Figure 2:
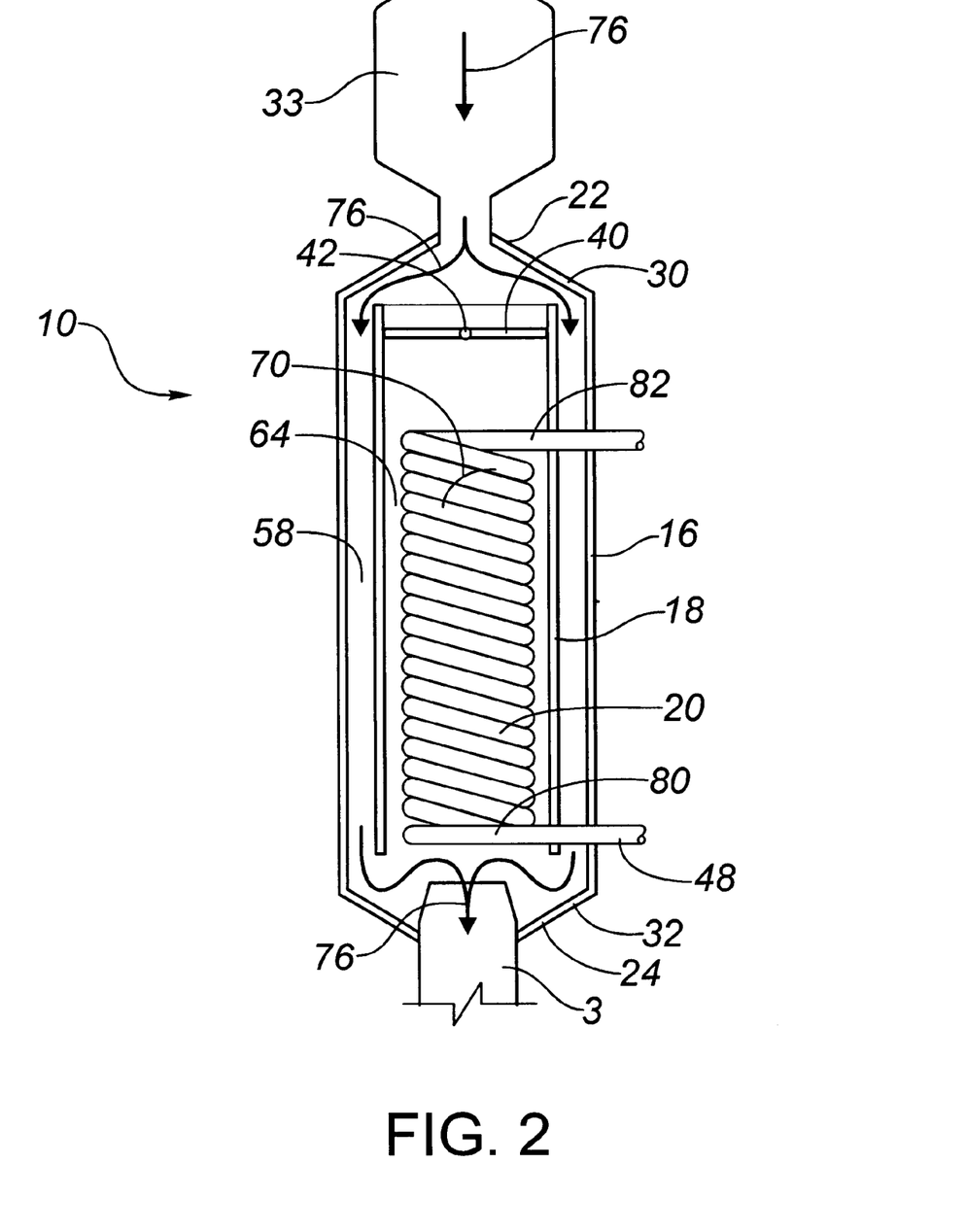
FIG. 2 is a side elevation view, in section, of the heat exchanger illustrated in FIG. 1, with a damper in a closed position.

Referring to FIG. 1, heat exchanger 10 is intended to be connected to an exhaust system 14 of a hydrocarbon fuelled engine 12. Heat exchanger 10 comprises an outer cylindrical body 16, an inner cylindrical body 18, and a heat exchange coil 20. Outer cylindrical body 16, inner cylindrical body 18 and heat exchange coil 20 are substantially coaxial with each other and are maintained in a spaced apart relationship from one another. Heat exchanger 10 has a first end 22 and a second end 24.

Outer cylindrical body 16 has peripheral sidewalls 26, an interior cavity 28, a first connection 30 at first end 22 of heat exchanger 10, and a second connection 32 at second end 24 of heat exchanger 10. Peripheral sidewalls 26 have an inner surface 60. First connection 30 connects heat exchanger 10 to a catalytic converter 33 following an exhaust manifold 34 of exhaust system 14. Second connection 32 connects heat exchanger 10 to exhaust pipe 36.

Inner cylindrical body 18 is disposed within interior cavity 28 of outer cylindrical body 16. As will hereinafter be further explained, this provides a diversion channel 58 between inner surface 60 of outer cylindrical body 16 and an outer surface 62 of inner cylindrical body 18. Inner cylindrical body 18 has an interior cavity 39 within which is disposed a damper style valve 40. Referring to FIG. 2, damper 40 has a size and shape which closely fits within inner cylindrical body 18 when damper 40 is in a closed position. Damper 40 is rotatable through 90 degrees about a spindle 42 at first end 22 of heat exchanger 10 by means of an electrical motor (not shown). Inner cylindrical body 18 is open at second end 24 of heat exchanger 10.

Referring again to FIG. 1, heat exchanger coil 20 is fabricated from a single length of conduit 48 which has an exterior surface 50 and an interior surface 52. Heat exchanger coil 20 preferably has fluid impervious sidewalls 44 formed out of a section of conduit 48 that is wound in a spiral coil 46 disposed within interior cavity 39 of inner cylindrical body 18. Spiral coil 46 is spaced from inner cylindrical body 18, thereby providing a first flow channel 64 between an exterior surface 66 of the inner tubular body 20 and an inner surface 68 of inner cylindrical body 18, and a second flow channel 70 through a passage 72 formed within spiral coil 46.

When damper 40 is in an open position the directions of flow of hot exhaust gases in first flow channel 64 and second flow channel 70 are shown by arrows 74. Referring to FIG. 2, when damper 40 is in closed position, access by hot exhaust gases to first flow channel 64 and second flow channel 70 is cut off. Hot exhaust gases entering heat exchanger 10 are thereby diverted to diversion channel 58. The directions of flow of hot exhaust gases in diversion channel 58 are shown by arrows 76.

Referring to FIG. 1, the conduit of the spiral coil 46 has an inlet end 80 and an outlet end 82, whereby a recirculated fluid 84 (such as coolant or lubricant) is circulated through coil 46. In FIG. 1, the recirculated fluid is coolant and a closed loop fluid recirculation conduit 86 is provided which circulates coolant in a direction shown by arrows 88. For this reason, closed loop fluid recirculation conduit 86 is shown as including a heater core 90, a radiator 98, a coolant overflow container 100 connected to radiator 98 by a tube 102, and a pressure relief valve 104. A coolant temperature sensor 94 located in engine 12 is coupled to a temperature actuated solenoid 96. When engine 12 is started, damper 40 is in the open position. Hot exhaust gases flowing from engine 12 through exhaust system 14 pass through first flow channel 64 and second flow channel 70. This heats coolant 84 in coil 46 which is circulating in closed loop fluid recirculation conduit 86. When a temperature of coolant in engine 12, as sensed by temperature sensor 94, exceeds a preset threshold actuation temperature, solenoid 96 is actuated to close damper 40. Hot exhaust gases from engine 12 are then diverted through diversion channel 58. With damper 40 closed, coolant 84 in coil 46 is not heated directly by hot exhaust gases from engine 12.

A second embodiment of heat exchanger for a motor vehicle exhaust generally identified by reference numeral 100, will now be described with reference to FIGS. 3 through 7.

Figure 3:
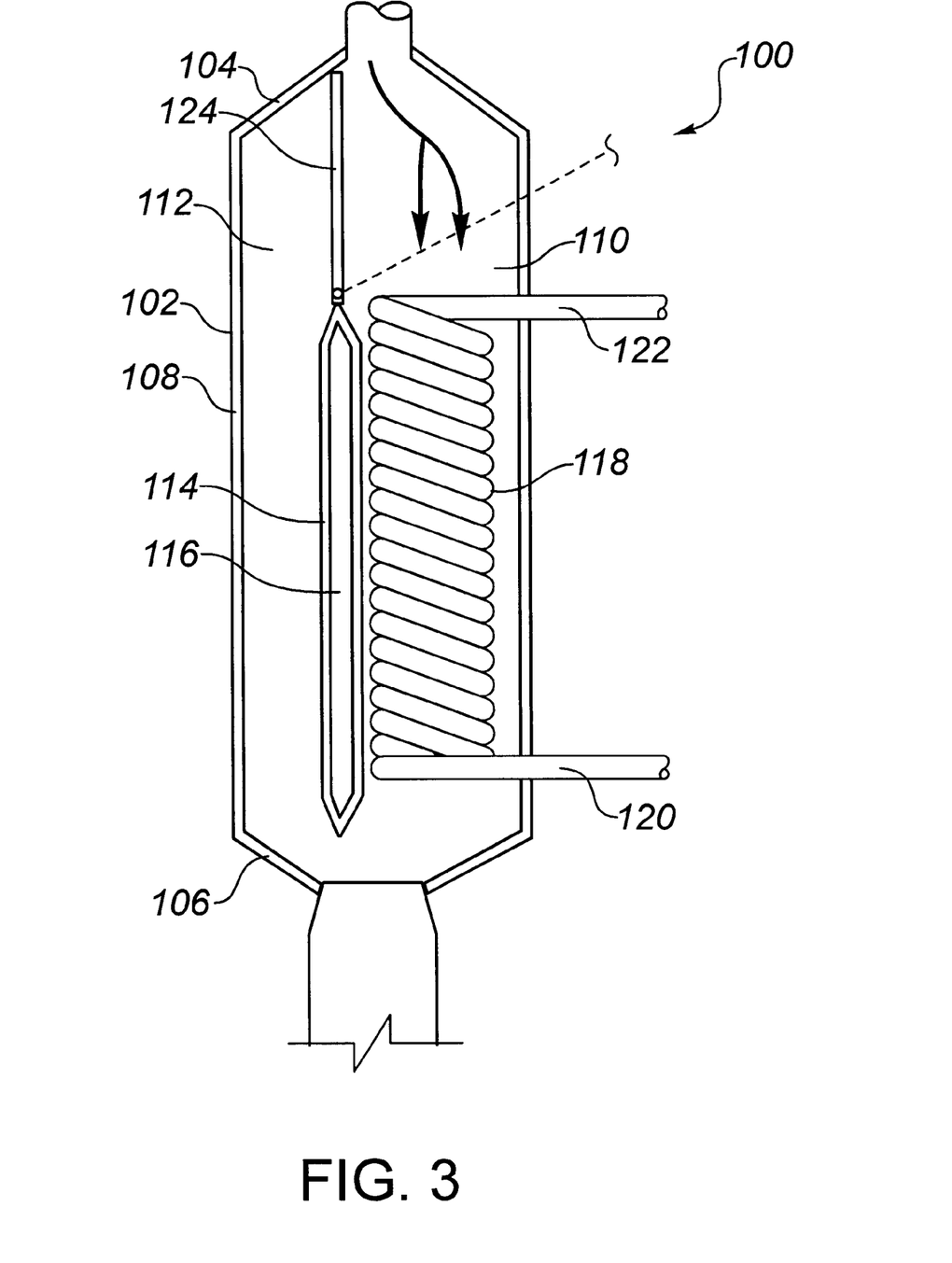
FIG. 3 is a top plan view, in section, of a second embodiment of heat exchanger for a motor vehicle exhaust constructed in accordance with the teachings of the present invention, with a valve positioned in a heat exchanger mode.
Figure 4:
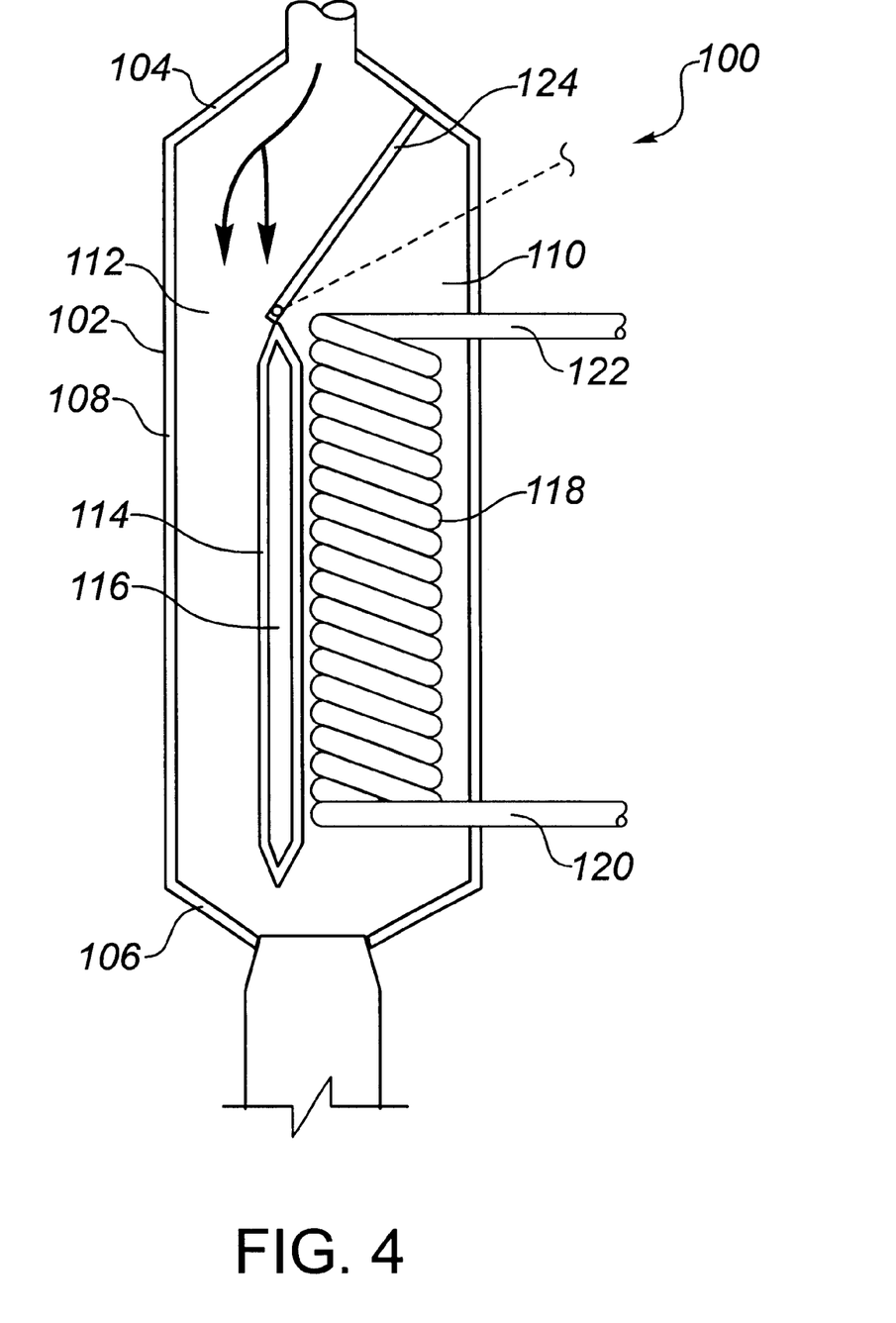
FIG. 4 is a top plan view, in section, of the heat exchanger for a motor vehicle illustrated in FIG. 3, with the valve positioned in a heat bypass mode.
Figure 5:
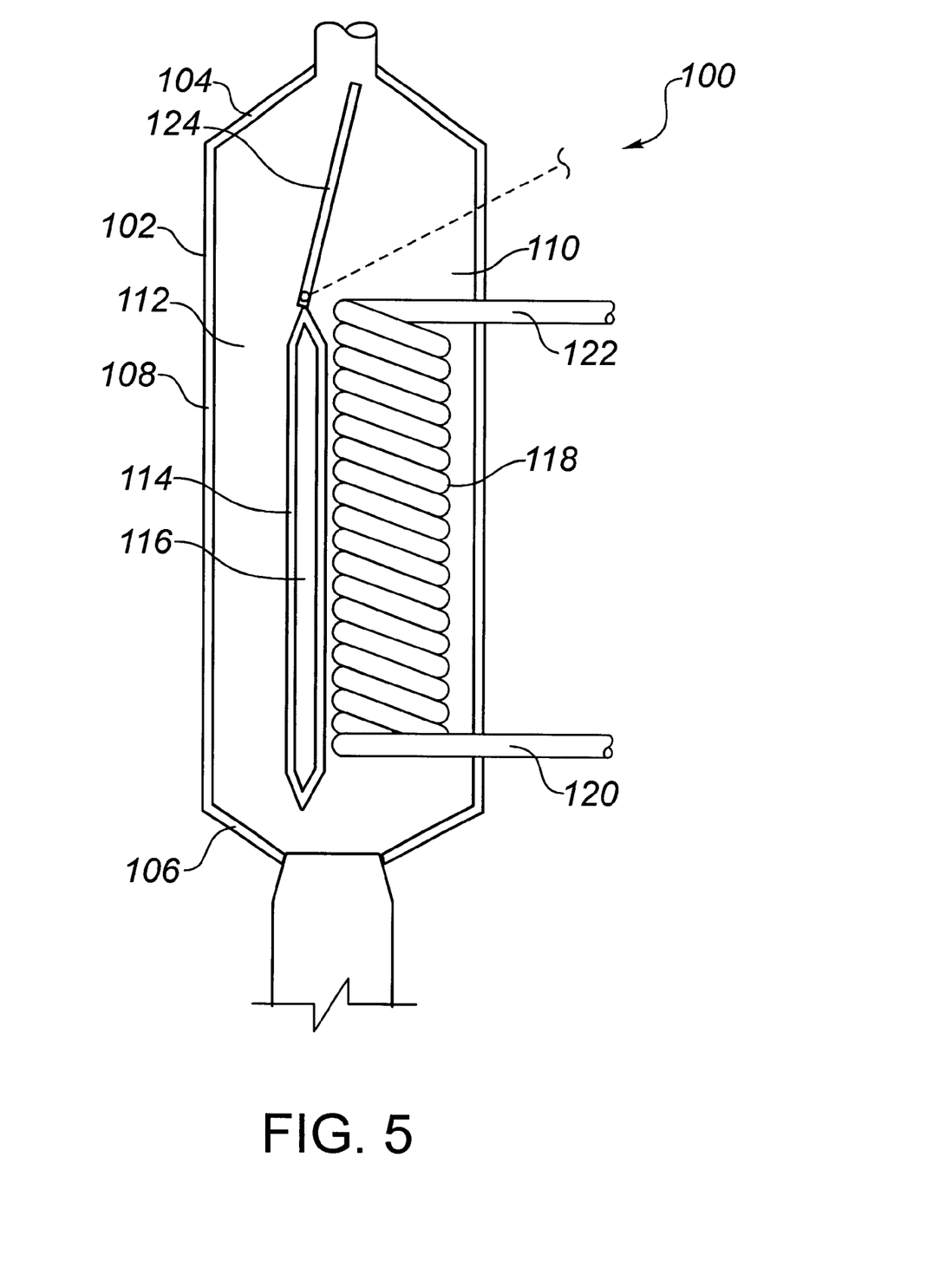
FIG. 5 is a top plan view, in section, of the heat exchanger for a motor vehicle illustrated in FIG. 3, with the valve positioned in an intermediate mode.

Referring to FIG. 3 through 5, heat exchanger for a motor vehicle exhaust 100 includes a tubular body 102 having a first end 104, a second end 106, a peripheral sidewall 108, a heat exchange flow passage 110 and a bypass flow passage 112. Each of heat exchange flow passage 110 and bypass flow passage 112 extends between first end 104 and second end 106. A dual wall 114 that has an insulating air flow cavity 116 is positioned between heat exchange fluid flow passage 110 and bypass fluid flow passage 112. A heat exchange coil 118 is positioned in heat exchange fluid flow passage 110. Heat exchange coil 118 has an inlet 120 and an outlet 122 extending through sidewall 108 of tubular body 102.

A pivotally movable valve member 124 is provided for selecting a path of fluid flow. Referring to FIG. 3, when valve member 124 is in a first limiting position, fluid flows through heat exchange fluid flow passage 110. Referring to FIG. 4, when valve member 124 is in a second limiting position, fluid flows through bypass fluid flow passage 112. Referring to FIG. 5, when valve member 124 is in an intermediate position, fluid flow is divided between heat exchange fluid flow passage 110 and bypass fluid flow passage 112.

The use and operation of heat exchanger 100 will now be described with reference to FIGS. 3 through 5. Heat exchanger 100 is designed to be used when one wishes to raise the temperature of automotive fluids or decrease the temperature of hot exhaust gases. This is accomplished when valve member 124 is positioned as illustrated in FIG. 3. In cold weather conditions, it is advantageous to preheat fluids used in the in car heater or engine oil. Hot exhaust gases from the exhaust system provide a ready source of heat for this purpose. The automotive fluid to be preheated is circulated through heat exchange coil 118. In hot weather conditions, the heat generated by exhaust gases is sometimes so extreme that it fatigues and causes failure of some components. In such circumstances it is advantageous to draw heat away from the hot exhaust gases. Heat exchange coil 118 is used to circulate fluids which draw heat from the hot exhaust gases. When conditions change it may be necessary to stop further heat exchange from occurring or quantitatively reduce the heat exchange. To prevent the heat exchange from occurring, valve member 124 is placed in the position illustrated in FIG. 3. To reduce the magnitude of the heat-exchange, valve member 124 is placed in the position illustrated in FIG. 5.

Figure 6:
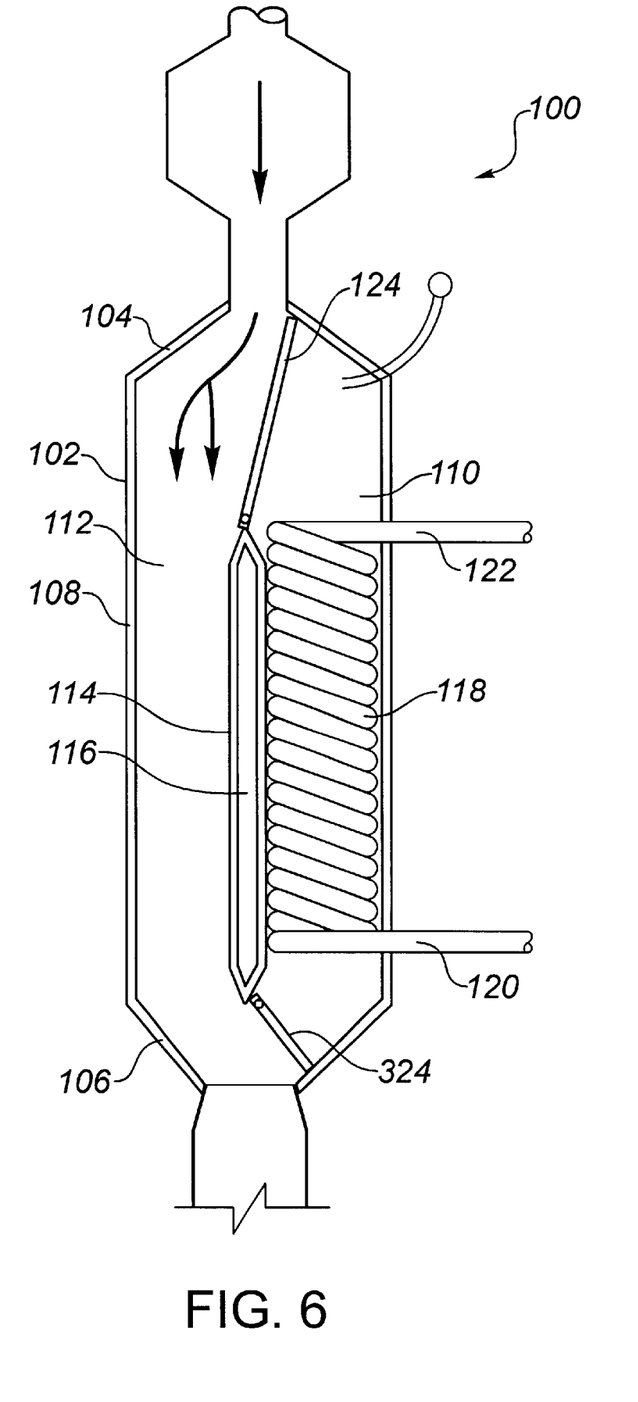
FIG. 6 is a top plan view, in section, of the heat exchanger for a motor vehicle illustrated in FIG. 4, having both upstream and downstream valve members positioned in a heat bypass mode.
Figure 7:
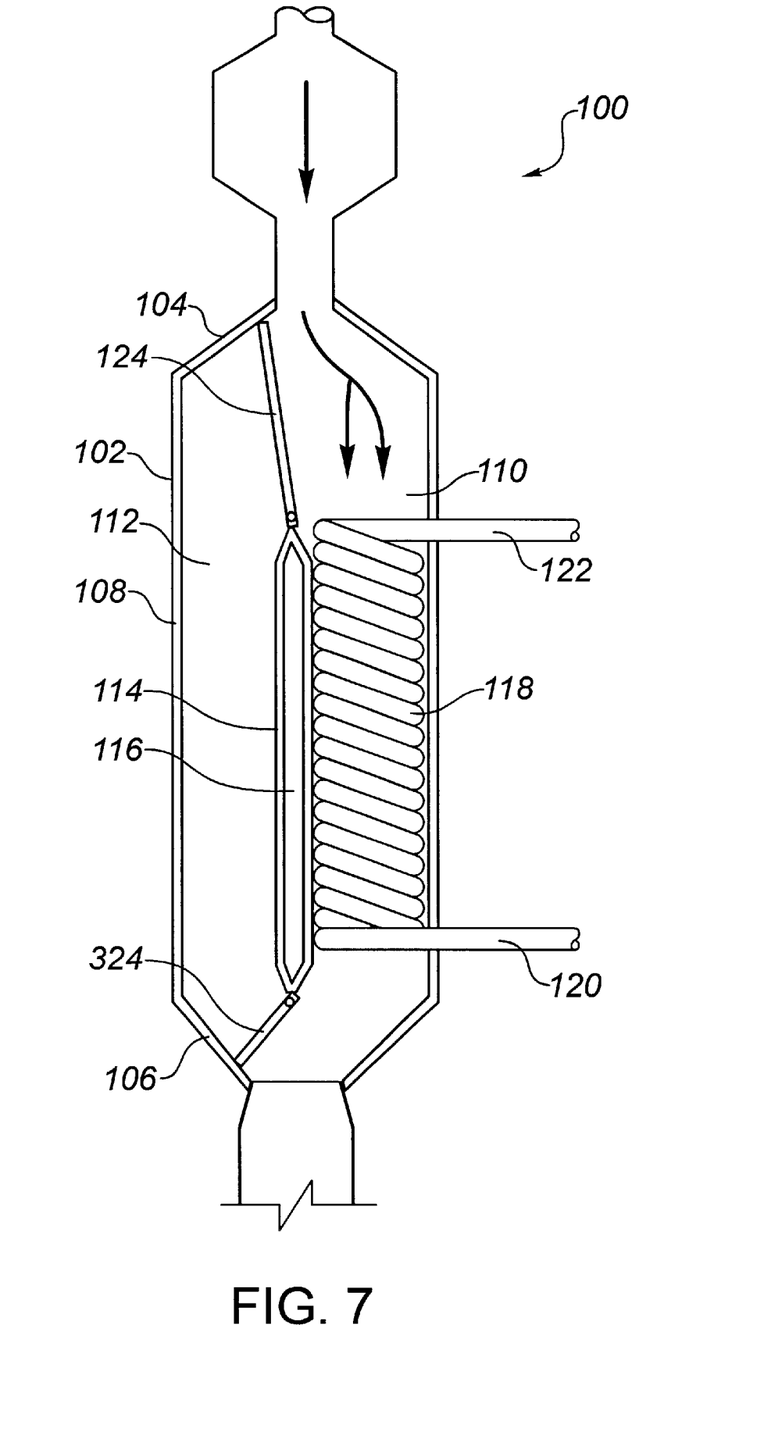
FIG. 7 is a top plan view, in section, of the heat exchanger for a motor vehicle illustrated in FIG. 3, having both upsteam and downstream valve members positioned in a heat exchange mode.

Referring to FIGS. 6 and 7, during testing it was determined that in some models of automobile the backpressure during operation was such that it was advisable to have a second valve member 324 downstream of valve member 124. Second valve member 324 served to further isolate heat exchange coil 118. Referring to FIG. 6, in the heat bypass mode valve member 124 and second valve member 324 are positioned so that all flow passes along bypass fluid flow passage 112. Second valve member 324 prevents any portion of the downstream flow from entering heat exchange passage 110. Referring to FIG. 7, in the heat exchange mode valve member 124 and second valve member 324 are positioned so that all flow passes along heat exchange passage 110.

In tests under both cold weather and warm weather operating conditions a reduction in emissions was achieved. The most significant reduction in emissions was in relation to $NO_x$. $NO_x$ was reduced by lowering the exhaust temperature. Hydrocarbon content, $CO^2$, and CO were reduced by rapidly warming up the engine.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A heat exchanger for a motor vehicle exhaust, comprising:
   a tubular body having a first end, a second end, a peripheral sidewall, and at least two flow passages that extend between the first end and the second end, the at least two flow passages including at least one heat exchange fluid flow passage and at least one bypass fluid flow passage;
   a heat exchange coil positioned in the at least one heat exchange fluid flow passage, the heat exchange coil having an inlet and an outlet extending through the sidewall of the tubular body;
   at least one valve for selecting between the at least one heat exchange fluid flow passage and the at least one bypass fluid flow passage; and an insulated dual wall positioned between the at least one heat exchange fluid flow passage and the at least one bypass fluid flow passage.

2. The heat exchanger as defined in claim 1, wherein the dual wall is insulated by circulating air.

3. A heat exchanger for a motor vehicle exhaust, comprising:

a tubular body having a first end, a second end, a peripheral sidewall, and at least two flow passages that extend between the first end and the second end, the at least two flow passages including at least one heat exchange fluid flow passage and at least one bypass fluid flow passage, with an insulated dual wall positioned between the at least one heat exchange fluid flow passage and the at least one bypass fluid flow passage;

a heat exchange coil positioned in the at least one heat exchange fluid flow passage, the heat exchange coil having an inlet and an outlet extending through the sidewall of the tubular body;

at least one pivotally movable valve member for selecting between the at least one heat exchange fluid flow passage and the at least one bypass fluid flow passage.

4. The heat exchanger as defined in claim 3, wherein the at least one valve member has an intermediate position in which the flow is divided between the at least one heat exchange fluid flow passage and the at least one bypass fluid flow passage.

5. The heat exchanger as defined in claim 3, wherein a first pivotally movable valve member is positioned to block access to the heat exchange fluid flow passage upstream of the heat exchange coil and a second pivotally movable valve member is positioned to block access to the heat exchange fluid flow passage downstream of the heat exchange coil.

6. The heat exchanger as defined in claim 3, wherein the dual wall is insulated by circulating air.

* * * * *

UNITED STATES PATENT AND TRADEMARK OFFICE
CERTIFICATE OF CORRECTION

PATENT NO.    : 6,330,910 B1
DATED         : December 18, 2001
INVENTOR(S)   : E. Bennett It is certified that error appears in the above-identified patent and that said Letters Patent is hereby corrected as shown below:

<u>Title page,</u>
Item [30], Foreign Application Priority Data, "Mar. 19," should read -- Mar. 3, -- and "Jun. 19," should read -- Jun. 6, --

Item [56], References Cited, U.S. PATENT DOCUMENTS, insert in appropriate numerical order the following:
| | | |
|---|---|---|
| -- 1,168,623 | 1/1916 | Furber |
| 1,231,208 | 6/1917 | Semmler |
| 1,884,538 | 10/1932 | Blake |
| 2,919,540 | 1/1960 | Percival |
| 3,158,192 | 11/1964 | Mizer |
| 3,691,772 | 9/1972 | Cross |
| 4,272,958 | 6/1981 | Waltrip |
| 4,391,235 | 7/1983 | Majkrzak |
| 4,424,775 | 1/1984 | Mayfield, Jr. |
| 4,537,349 | 8/1985 | Stolz |
| 4,611,466 | 9/1986 | Keedy |
| 5,005,542 | 4/1991 | Rissanen |
| 5,551,384 | 9/1996 | Hollis |
| 5,799,632 | 9/1998 | Bennett |
| 5,033,264 | 7/1991 | Cabral |
| 4,593,748 | 6/1986 | Kramb |
| 3,903,694 | 9/1975 | Aine |
| 4,813,632 | 3/1989 | Woodhouse -- |

Item [56], References Cited, U.S. PATENT DOCUMENTS, insert in appropriate numerical order the following:
-- 5,272,874    12/1993    Paas --

Item [56], References Cited, FOREIGN PATENT DOCUMENTS, insert in appropriate order the following:
-- WO 94/00579    1/1994 (WO)
   3225373       7/1982 (DE) --

UNITED STATES PATENT AND TRADEMARK OFFICE
CERTIFICATE OF CORRECTION

PATENT NO. : 6,330,910 B1
DATED : December 18, 2001
INVENTOR(S) : E. Bennett

It is certified that error appears in the above-identified patent and that said Letters Patent is hereby corrected as shown below:

<u>Title page,</u>
Item [56], References Cited, FOREIGN PATENT DOCUMENTS, insert in appropriate order the following:
--             OTHER PUBLICATIONS
ABSTRACT, cover page and drawings from German patent 2829454, 1/1980, 5 pages. --

Signed and Sealed this

Twenty-seventh Day of August, 2002

*Attest:*

*Attesting Officer*

JAMES E. ROGAN
*Director of the United States Patent and Trademark Office*